UNITED STATES PATENT OFFICE.

ERNST FRANK, OF BERLIN, GERMANY, ASSIGNOR TO PATENT-TREUHAND-GESELLSCHAFT FUR ELEKTRISCHE GLUHLAMPEN M. B. H., OF BERLIN, GERMANY, A CORPORATION OF GERMANY.

METHOD FOR THE MANUFACTURE OF HOLLOW GLASS BODIES PARTICULARLY FOR ELECTRIC GLOWLAMP BULBS.

1,420,996.     Specification of Letters Patent.    Patented June 27, 1922.

No Drawing.     Application filed September 3, 1921. Serial No. 498,484.

*To all whom it may concern:*

Be it known that I, ERNST FRANK, a citizen of Germany, residing at Berlin, Germany, have invented certain new and useful Improvements in Methods for the Manufacture of Hollow Glass Bodies Particularly for Electric Glowlamp Bulbs (for which an application for patent has been filed in Germany January 10, 1918, Ser. No. A. 30,074, VI/32b, in the name of the Allgemeine Elektrizitats Gesellschaft), of which the following is a specification.

Hollow bodies of clear, transparent glass have been variously used, which are partly covered on their surface with opaque opal glass or colored enamel. In particular it is customary to provide electric lamp globes, especially pocket lamps with a white reflector on their base. Three methods have become known for the manufacture of these white or colored covering, of which however only two have been practically applied to globes for electric incandescent lamps. The first method not a commercial one owing to its expensiveness, consists in blowing the globes with the blow pipe in the glass works in the manner known with hollow glass bodies and covering the clear glass body with enamel. The second method, which in principle corresponds to the covering by depositing as customary in glass works, has been practically applied and consists in that a small piece of colored glass pipe (preferably of opal glass) and corresponding to the desired size of the reflector was pulled over a clear glass pipe, and then after the fusing of both parts the globe was blown, whereby the latter received the enamel cover at the places desired. This method was always followed by a considerable waste caused by the different physical properties of the two kinds of glass. The third method consists in that clear glass globes, which had already their final outer shape, were provided with an enamel in a pulpy state by means of spreading or painting or by immersion, whereupon the enamel was fused together by heating up to about 500° C. With this process, the glass globes may change their shape at the required high temperature, which latter is already close to the softening point of the glass of the globes.

The present invention avoids the drawbacks of both known processes and consists in that the enamel is applied by a brush or otherwise in a pulpy state to a part of a clear glass tube, and previous to the blowing of the globe. The enamel thus put on is permitted to dry and it is preferable to heat the glass tubes to several 100° C., say between 100° C. and 300° C., prior to further manufacture; however, such special heating is not required in all cases. Thereupon takes place the heating proper of the glass tube up to its capability of being kneaded, and the blowing into the final shape. By this relatively high temperature which must be applied in this instance, an intimate connection between the enamel layer and the glass globe is effected, the enamel fuses completely and forms an excellently reflecting smooth opaque covering. From a single glass tube of corresponding length a large number of globes may be manufactured, by spreading or painting the enamel paste in small yet determined distances along the tube, so that uncovered spaces will remain between the coated portions and then severing the long tube into blanks for individual lamps each having a clear portion and enameled portion.

From these blanks the individual bulbs are blown.

I claim:

1. The method of manufacturing hollow glass articles that are provided over a portion of their surface with a colored coating, such as electric gas lamp bulbs, which comprises coating a glass tube for a part of its length with enamel, drying the enamel and heating the tube and coating to blowing temperature and immediately blowing the article.

2. The method of manufacturing hollow glass articles having a clear transparent portion and an opaque portion, as electric gas lamp bulbs, which comprises coating a clear glass tube at a portion of its length with a colored enameled glass pump, drying the pulp, heating the coated tube to blowing temperature and blowing the tube to shape.

3. The method of manufacturing hollow glass articles having a clear transparent portion and an opaque portion, which comprises coating a clear glass tube over a portion of its length with a paste of glass powder, heating the tube and coating to a temperature below that required for blowing and then heating the tube and dried coating to blowing temperature and forming the glass by blowing.

4. The method of manufacturing hollow glass articles having a clear transparent portion and an opaque portion, which comprises coating a short clear glass tube over a portion of its length with a glass enamel paste, heating the tube a few hundred degrees C., then heating the tube to blowing temperature, thereby simultaneously fusing the coating to the tube and blowing the tube to shape.

5. In the method of manufacturing hollow glass articles having a clear portion and an opaque portion, coating a long clear glass tube with fusible opaque glass paste at intervals along its length, severing the tube into blanks each having a clear portion and a coated portion, heating the blank to blowing temperature and simultaneously fusing the coating, and blowing the article.

In testimony whereof I affix my signature in presence of a witness.

DR. PHIL. ERNST FRANK.

Witness:
UDEUS VON MIDA.